United States Patent
Tan et al.

(10) Patent No.: US 12,440,079 B2
(45) Date of Patent: Oct. 14, 2025

(54) CLEANING ROBOT AND CONTROL METHOD THEREOF

(71) Applicant: Positec Power Tools (Suzhou) Co., Ltd., Suzhou (CN)

(72) Inventors: Yiyun Tan, Suzhou (CN); Mingjian Xie, Suzhou (CN); Shisong Zhang, Suzhou (CN)

(73) Assignee: Positec Power Tools (Suzhou) Co., LTD., Suzhou (CN)

( * ) Notice: Subject to any disclaimer, the term of this patent is extended or adjusted under 35 U.S.C. 154(b) by 256 days.

(21) Appl. No.: 17/638,795

(22) PCT Filed: Aug. 26, 2020

(86) PCT No.: PCT/CN2020/111411
§ 371 (c)(1),
(2) Date: Feb. 25, 2022

(87) PCT Pub. No.: WO2021/037065
PCT Pub. Date: Mar. 4, 2021

(65) Prior Publication Data
US 2022/0280009 A1 Sep. 8, 2022

(30) Foreign Application Priority Data
Aug. 26, 2019 (CN) .......................... 201910788271.0

(51) Int. Cl.
*G05D 1/00* (2024.01)
*A47L 11/28* (2006.01)
*A47L 11/40* (2006.01)

(52) U.S. Cl.
CPC .......... *A47L 11/4011* (2013.01); *A47L 11/28* (2013.01); *A47L 11/4055* (2013.01);
(Continued)

(58) Field of Classification Search
CPC .. A47L 11/4011; A47L 11/28; A47L 11/4055; A47L 11/4066; A47L 2201/04;
(Continued)

(56) References Cited

U.S. PATENT DOCUMENTS

| 5,815,880 A | 10/1998 | Nakanishi |
| 2005/0251292 A1 | 11/2005 | Casey et al. |

(Continued)

FOREIGN PATENT DOCUMENTS

| CN | 104526699 A | 4/2015 |
| CN | 104825101 A | 8/2015 |

(Continued)

OTHER PUBLICATIONS

First Office Action in CN application No. 201910788271.0, dated Sep. 6, 2021.
(Continued)

*Primary Examiner* — Hussein Elchanti
(74) *Attorney, Agent, or Firm* — Lee & Hayes, P.C.

(57) ABSTRACT

A cleaning robot (and a control method thereof) including a body, a mover, to drive the cleaning robot to move on a ground and perform cleaning work, a detector, configured to detect a ground feature in front of the cleaning robot, a positioner, configured to obtain position information of the cleaning robot, and a controller, electrically connected to the detector and the positioner. The controller stores or obtains a map of a working region of the cleaning robot and can determine a position of the cleaning robot in the map according to the position information of the cleaning robot. Further, the controller recognizes the ground feature according to a detection result of the detector and controls, according to the position of the cleaning robot in the map, the cleaning robot to perform a corresponding action.

7 Claims, 10 Drawing Sheets

(52) U.S. Cl.
CPC ........ *A47L 11/4066* (2013.01); *G05D 1/0214* (2013.01); *G05D 1/0274* (2013.01); *A47L 2201/04* (2013.01); *A47L 2201/06* (2013.01); *G05D 1/0227* (2013.01); *G05D 1/024* (2013.01); *G05D 1/0255* (2013.01); *G05D 1/0257* (2013.01)

(58) Field of Classification Search
CPC ............. A47L 2201/06; G05D 1/0214; G05D 1/0274; G05D 1/0227; G05D 1/024; G05D 1/0255; G05D 1/0257
See application file for complete search history.

(56) References Cited

U.S. PATENT DOCUMENTS

| | | | |
|---|---|---|---|
| 2014/0075689 A1 | 3/2014 | Windorfer | |
| 2017/0083022 A1 | 3/2017 | Tang | |
| 2018/0360281 A1 | 12/2018 | Shin et al. | |
| 2018/0368644 A1 | 12/2018 | Chavana, Jr. et al. | |
| 2019/0018420 A1 | 1/2019 | Yee et al. | |
| 2019/0101926 A1 | 4/2019 | Takaoka et al. | |
| 2019/0142237 A1 | 5/2019 | Isenberg et al. | |
| 2019/0212752 A1* | 7/2019 | Fong | G06V 20/36 |
| 2020/0000302 A1* | 1/2020 | Morin | A47L 11/4088 |
| 2020/0019156 A1* | 1/2020 | Drew | G05D 1/0044 |
| 2021/0068605 A1* | 3/2021 | Kim | G05D 1/0291 |
| 2021/0114220 A1* | 4/2021 | Shin | B25J 9/1697 |
| 2021/0283773 A1* | 9/2021 | Ahn | A47L 9/2857 |
| 2022/0066463 A1* | 3/2022 | Byun | G05D 1/0214 |
| 2022/0379924 A1* | 12/2022 | Foster | B60W 30/18154 |

FOREIGN PATENT DOCUMENTS

| | | | |
|---|---|---|---|
| CN | 106137057 A | 11/2016 | |
| CN | 106527449 A | 3/2017 | |
| CN | 106859512 A | 6/2017 | |
| CN | 106998980 A | 8/2017 | |
| CN | 106998985 A | 8/2017 | |
| CN | 206403708 U | 8/2017 | |
| CN | 107280590 A | 10/2017 | |
| CN | 107456162 A | 12/2017 | |
| CN | 107471188 A | 12/2017 | |
| CN | 107788913 A | 3/2018 | |
| CN | 108436921 A | 8/2018 | |
| CN | 108514381 A | 9/2018 | |
| CN | 108814437 A | 11/2018 | |
| CN | 108888187 A | 11/2018 | |
| CN | 109358623 A | 2/2019 | |
| CN | 109602341 A | 4/2019 | |
| CN | 208892436 U | 5/2019 | |
| CN | 109846427 A | 6/2019 | |
| CN | 109984688 A | 7/2019 | |
| EP | 2 457 486 A2 | 5/2012 | |
| EP | 2 457 486 A3 | 8/2013 | |
| EP | 3 417 755 A1 | 12/2018 | |
| EP | 3486039 A1 | 5/2019 | |
| JP | H947413 A | 2/1997 | |
| JP | 201461375 A | 7/2014 | |
| JP | 2019005577 A | 1/2019 | |
| JP | 2019121364 A | 7/2019 | |
| JP | 2019171001 | 10/2019 | |
| JP | 20198879 A | 8/2020 | |
| KR | 10-2019-0089790 A | 7/2019 | |

OTHER PUBLICATIONS

Second Office Action in CN application No. 201910788271.0, dated Jan. 30, 2022.
First Office Action in CN application No. 202080059820.1, dated Dec. 23, 2022.
Third Office Action in CN application No. 201910788271.0, dated May 19, 2022.
Second Office Action in CN application No. 202080059820.1, dated Aug. 11, 2023.
First search in CN application No. 201910788271.0 , dated Sep. 6, 2021.
First search in CN application No. 202080059820.1, dated Dec. 23, 2022.
Supplementary search in CN application No. 202080059820.1, dated Aug. 11, 2023.
Supplementary search in CN application No. 201910788271.0 , dated Jan. 30, 2022.
Supplementary search in CN application No. 201910788271.0 , dated May 19, 2022.
Notice of Reasons for Refusal in application No. JP2022-513138, dated Dec. 12, 2023.
Notice of Reasons for Refusal in application No. JP2022-513138, dated Apr. 12, 2023.
Request for the Submission of an Opinion in application No. KR10-2022-7006604, dated Feb. 29, 2024.
International Search Report in application No. PCT/CN2019/122612, dated May 29, 2020.
Written Opinion in application No. PCT/CN2019/122612, dated May 29, 2020.

\* cited by examiner

CLEANING ROBOT AND CONTROL METHOD THEREOF

CROSS-REFERENCE TO RELATED APPLICATION

This application is a National Stage Application of International Application No. PCT/CN2020/111411, filed on Aug. 26, 2020, which claims benefit of and priority to Chinese Patent Application No. 201910788271.0, filed on Aug. 26, 2019, all of which are hereby incorporated by reference in their entirety for all purposes as if fully set forth herein.

TECHNICAL FIELD

The present disclosure, including embodiments of the invention, relates to the technical field of intelligent robots, and in particular, to a cleaning robot and a control method thereof.

BACKGROUND

In recent years, with the rapid development of computer technologies and artificial intelligence science, intelligent robotics technology has gradually become a hot spot in the field of modern robotics research. One of the most practical forms of intelligent robots is a sweeping robot.

The sweeping robot, also referred to as an automatic sweeper, a robotic vacuum cleaner, or the like, can automatically complete ground cleaning work in a room with specific artificial intelligence. In operation, the sweeping robot generally absorbs ground debris into a garbage storage box of the sweeping robot using, for example, brushing and vacuuming operations, to achieve a function of ground cleaning. A body of the robot is a movable device with an automation technology or a vacuum cleaner equipped with a dust-collecting box, and a control path is set for matching the body. During use, the robot walks (i.e., moves/travels) repeatedly indoors to perform sweeping according to a path such as sweeping along an edge, centralized sweeping, random sweeping, or sweeping along a straight line. The existing sweeping robot mainly cleans garbage by sweeping and vacuuming. When there are liquid stains such as water stains and oil stains on the ground or stubborn stains attached to the ground that are difficult to be cleaned, known sweeping robots cannot effectively clean up.

To clean up the above stains that are difficult to be swept and vacuumed, a mopping machine or a sweeping and mopping integrated machine in which a mopping function is integrated has appeared.

In a specific scenario, when the robot is in a mopping mode, a cleaned object (for example, a floor or a tile) is wetted on the ground and then cleaned. If there is an object (for example, a carpet) in front of the robot that is not suitable for being wetted and cleaned on the ground, the user hopes that the robot can automatically recognize the front object and not enter the front object.

Presently, to recognize, for example, the front object in the mopping mode, one of the adopted methods is to set a virtual forbidden region by placing a magnetic strip at or near the front object, and to control the robot to prevent the robot from entering the virtual forbidden region. However, the foregoing method of setting the magnet has particular defects: not only that the magnet needs to be mounted before use, but also that the magnet may be moved during use, causing the set virtual forbidden region to be displaced or even to be ineffective. On the whole, the usage experience and the reliability are relatively poor.

Additionally, during actual use, most cleaning robots can only either recognize ground features ahead according to an indoor situation, or perform corresponding determining according to the indoor situation, and perform a corresponding action flexibly, to meet different environmental requirements, resulting in a low degree of intelligence and relatively poor user experience.

SUMMARY

To overcome at least one defect in the prior art, embodiments of the present invention provide a cleaning robot and a control method thereof, which can recognize a ground feature ahead and perform a corresponding action with reference to map information, so that the degree of intelligence is high, the usage reliability is high, and comprehensive user experience is better.

The foregoing objective of the present embodiments may be achieved by using the following technical solutions.

According to the cleaning robot and control method provided in the embodiments of this application, a type of a ground feature (e.g., object) in front of the cleaning robot can be recognized according to a detection result of the detection device. In a traveling and working process, the cleaning robot can label a position in a map in real time by using position information obtained by a positioning device and the map of a working region of the cleaning robot, and perform a corresponding action according to the position labeled in the map, thereby achieving different functions, so that the degree of intelligence is high, and the usage reliability is high, thereby greatly improving comprehensive user experience.

Specifically, for different positions of the cleaning robot in the map, the following different control actions are adopted:

1. When the cleaning robot is near a non-entrance/exit region and recognizes, in a forward direction, a ground feature ahead as a carpet according to a detection result of the detection device, for example, a convexity of which a height exceeds a preset value (for example, 5 mm) is sensed, the cleaning robot does not enter a front region, so that the carpet can be prevented from being dirtied.

2. When the cleaning robot is near an entrance/exit region (e.g., door) and recognizes, in a forward direction, a ground feature ahead as a carpet according to a detection result of the detection device, for example, a convexity of which a height exceeds a preset value (for example, 5 mm) is sensed, the mopping assembly is lifted, and the cleaning robot enters a front region, so that the cleaning robot can move to different traveling regions and perform cleaning work within a global map range without being limited by a single traveling region, and the carpet is not dirtied.

The cleaning robot provided in this application recognizes the ground feature ahead mainly based on a physical size of the ground feature. Therefore, compared with other recognition manners in the prior art, during use, the cleaning robot can reliably recognize ground features including the carpet and no virtual forbidden region needs to be set.

Further, for a case that the cleaning robot does not enter the front region, by controlling a mounting angle of the detection device, the ground feature ahead may be recognized in advance by a particular distance, so that the cleaning robot can be more reliably prevented from entering the front region such as a carpet or a cliff that is not at the door.

BRIEF DESCRIPTION OF THE DRAWINGS

The embodiments of the present invention are further described below with reference to the accompanying drawings.

DETAILED DESCRIPTION

Figure 1:
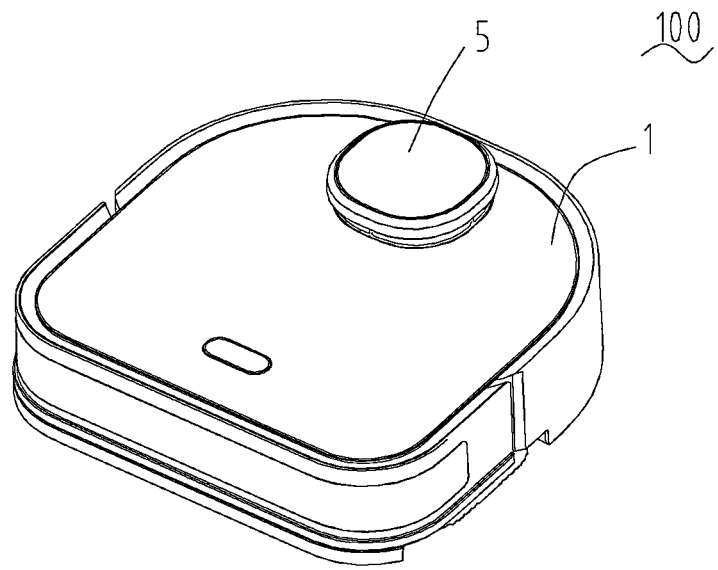
FIG. 1 and FIG. 2 are schematic structural diagrams of a cleaning robot according to an embodiment of the present invention.
Figure 2:
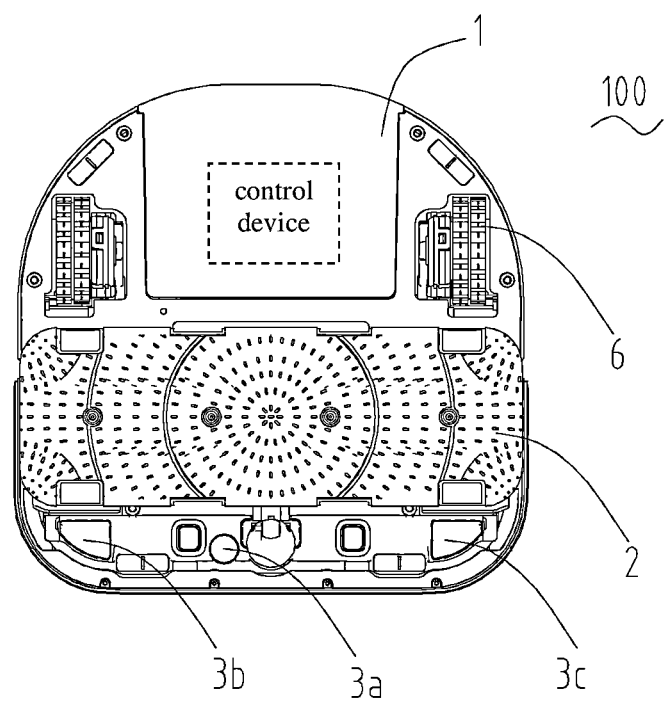
Figure 3:
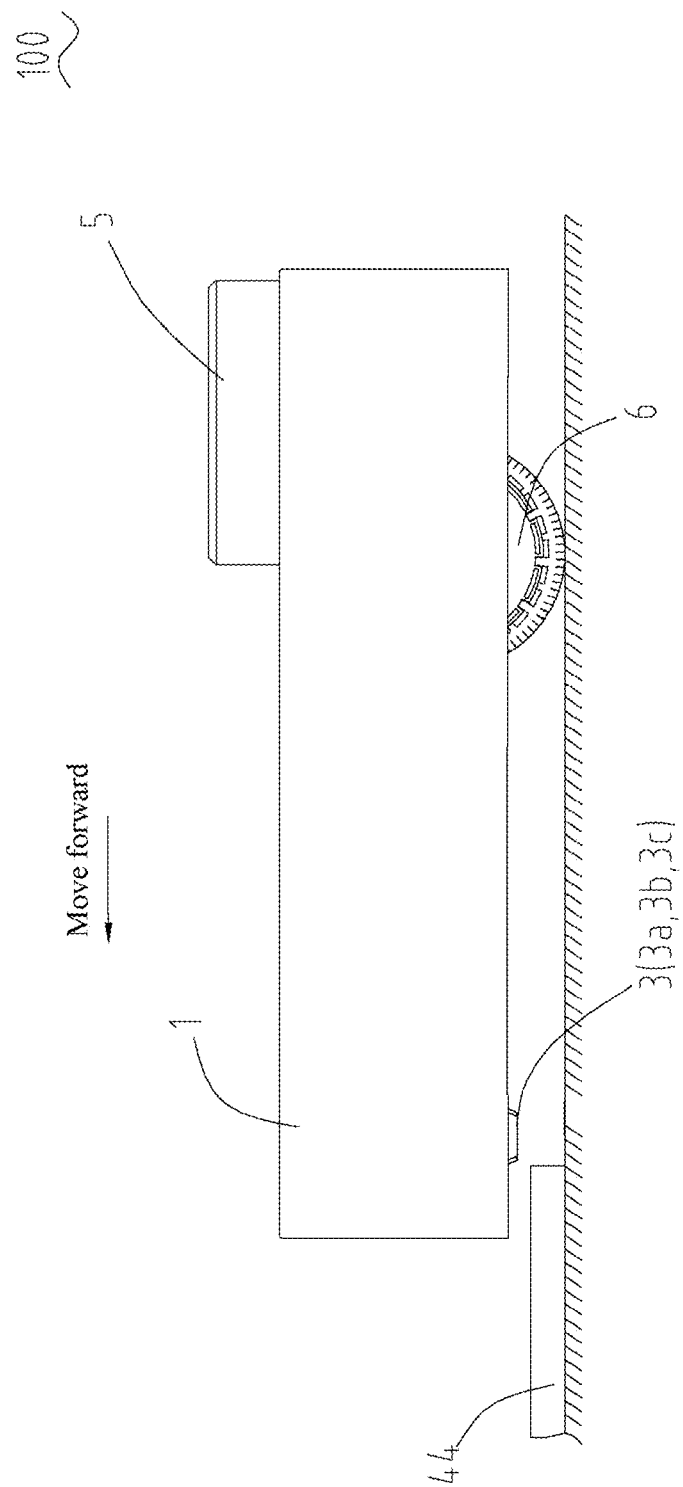
FIG. 3 and FIG. 4 are schematic diagrams of a working scenario of a cleaning robot according to an embodiment of the present invention.
Figure 4:
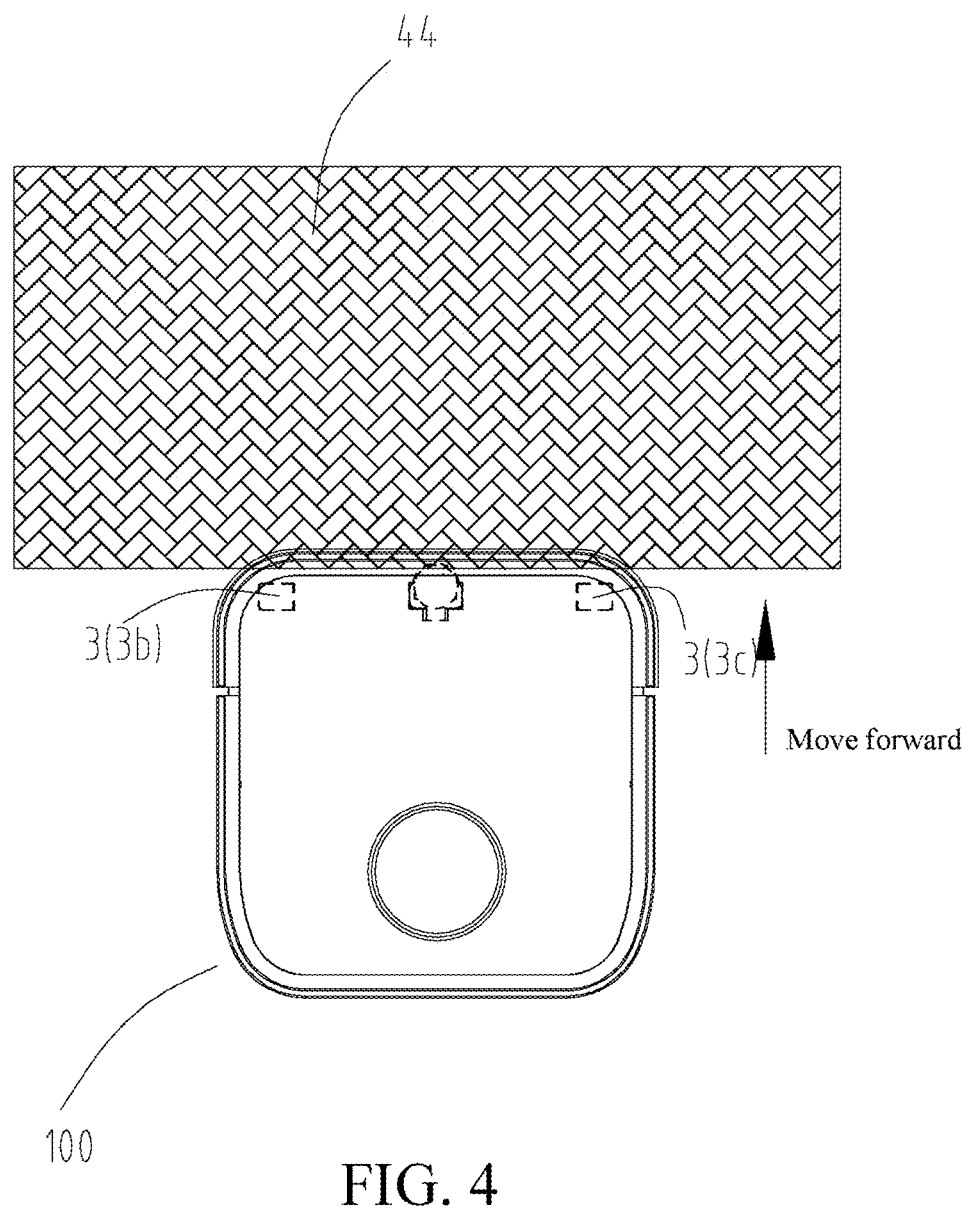

The technical solution of the embodiments of the invention will be described in detail below with reference to the accompanying drawings and implementations. It should be understood that these implementations are only used to illustrate the embodiments and not to limit the scope of the embodiments. After reading the embodiments, various equivalent modifications, made by those skilled in the art, to the embodiments shall fall within the scope defined by the appended claims of this application.

It should be noted that, when a component is referred to as "being disposed to" another component, the component may be directly on the another component, or there may be an intermediate component. When a component is considered to be "connected to" another component, the component may be directly connected to the another component, or there may be an intermediate component. The terms "vertical", "horizontal", "upper", "down", "left", "right", and similar expressions used in this specification are only for purposes of illustration.

Unless otherwise defined, meanings of all technical and scientific terms used in this specification are the same as those usually understood by a person skilled in the art to which this application belongs. In this application, terms used in the embodiments of this application are merely intended to describe objectives of the specific embodiment, but are not intended to limit this application. The term "and/or" used in this specification includes any and all combinations of one or more related listed items.

Referring to FIG. 1 through FIG. 4, an embodiment of this application provides a cleaning robot 100. The cleaning robot 100 may include: a body 1, a movable device 6, a positioning device 5, a detection device 3, a control device (not shown in the figure), and the like. The movable device 6 includes a walking wheel disposed below the body 1, a transmission mechanism in transmission connection with the walking wheel, and the like. The cleaning robot 100 may further include a battery disposed in the body 1. During use, electric energy provided by the battery is converted into mechanical energy by using the transmission mechanism and the mechanical energy is transferred to the walking wheel, to drive the cleaning robot 100 to move on a ground and perform cleaning work.

In one embodiment, the detection device 3 is configured to detect a ground feature 44 in front of the cleaning robot. For example, the detection device 3 can recognize whether a ground ahead is a carpet. Specifically, the detection device may be any one or a combination of the following: an ultrasonic sensor, an optical sensor (for example, an infrared sensor), a millimeter wave radar sensor, a mechanical switch, and the like. In this embodiment, the detection device 3 includes an ultrasonic sensor 3a and mechanical switches 3b and 3c. Specifically, the body 1 includes a front portion and a rear portion in a forward direction. The ultrasonic sensor and the mechanical switches are all disposed on the front portion of the body and disposed at the bottom of the body, to effectively detect a carpet in the forward direction of the robot and to do so in time. A principle on which the ultrasonic sensor detects a carpet is similar to a conventional application in the art. The carpet is recognized by using the principle that transmitted signals have different reflection coefficients after being reflected by grounds with different roughness or received signals have different strengths. Details are not described herein again. The mechanical switches may detect the carpet through cooperation between a structural member and a switching device. For example, when encountering a carpet, the movable structural member moves under the action of an external force to trigger the switching device. The switching device includes a micro switch, a photoelectric switch, a Hall switch, a reed switch, or the like. Certainly, in another embodiment implementation, the detection device may be alternatively mounted on the rear portion of the body, or on another position such as a side portion, and can detect the ground feature 44 ahead when the cleaning robot moves in different directions.

In this embodiment, the positioning device 5 may be disposed on the body 1 and configured to obtain position information of the cleaning robot. Specifically, the positioning device may be a laser (simultaneous localization and mapping) SLAM positioning device or a visual SLAM positioning device. A specific form of the positioning device may vary according to different working principles of the positioning device, which is not specifically limited in this application.

In this embodiment, the control device may store or obtain a map of a working region of the cleaning robot (briefly referred to as a global map 4). Specifically, a manner of obtaining the global map by the cleaning robot provided with the positioning device may be implemented based on a current laser SLAM mapping technology or visual SLAM mapping technology or a combination of a laser SLAM mapping technology and a visual SLAM mapping technology. However, the manner of obtaining the global map is not limited to the above example(s). For example, the manner may be further receiving data sent by an APP of a user terminal. This is not specifically limited in this application.

In a different embodiment, the global map 4 may be pre-established based on a signal detected by the positioning device before the cleaning robot works formally, and is stored in a storage unit of the control device. Certainly, the global map 4 may alternatively be synchronously established based on a signal detected by the positioning device during traveling and working of the cleaning robot. This is not specifically limited in this application.

Figure 8:
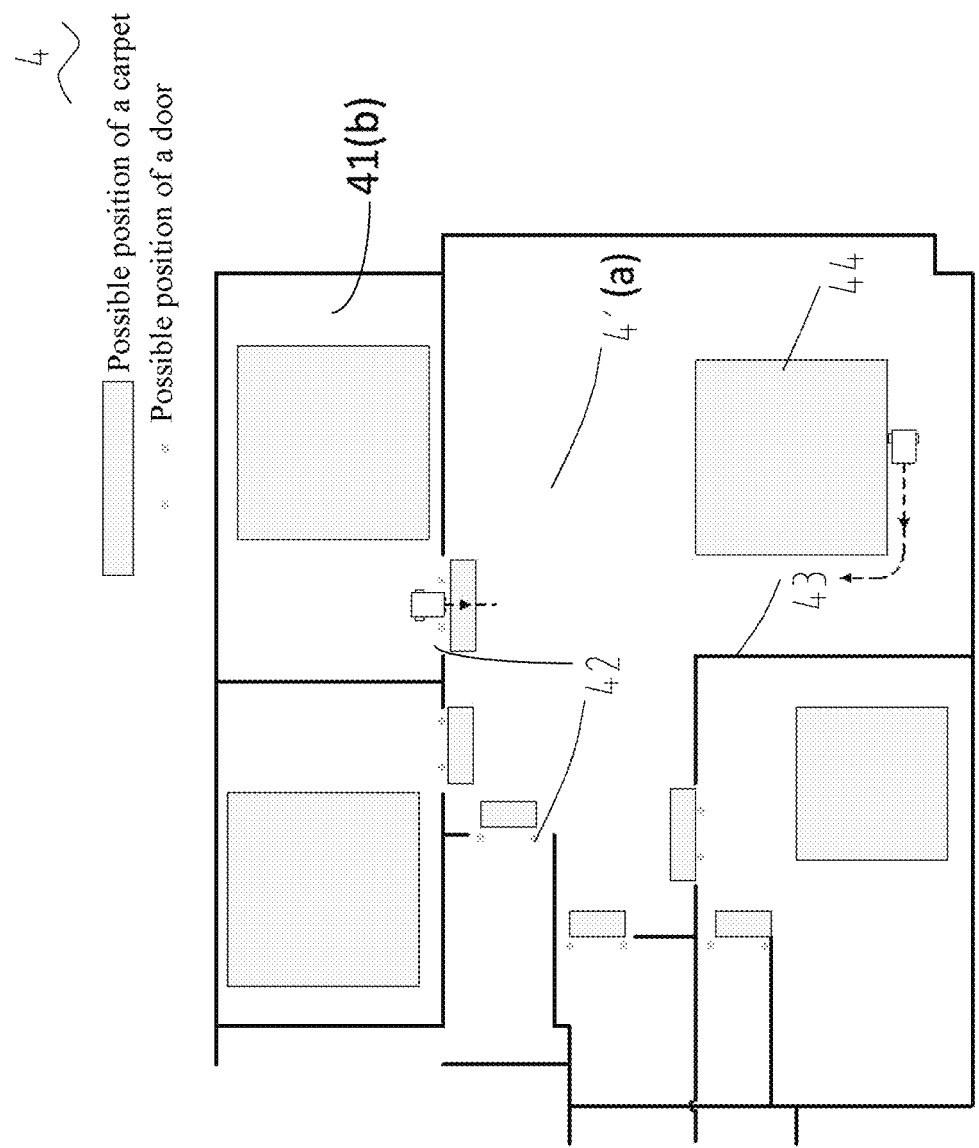
FIG. 8 and FIG. 9 are schematic diagrams of a global map according to an embodiment of the present invention.
Figure 9:
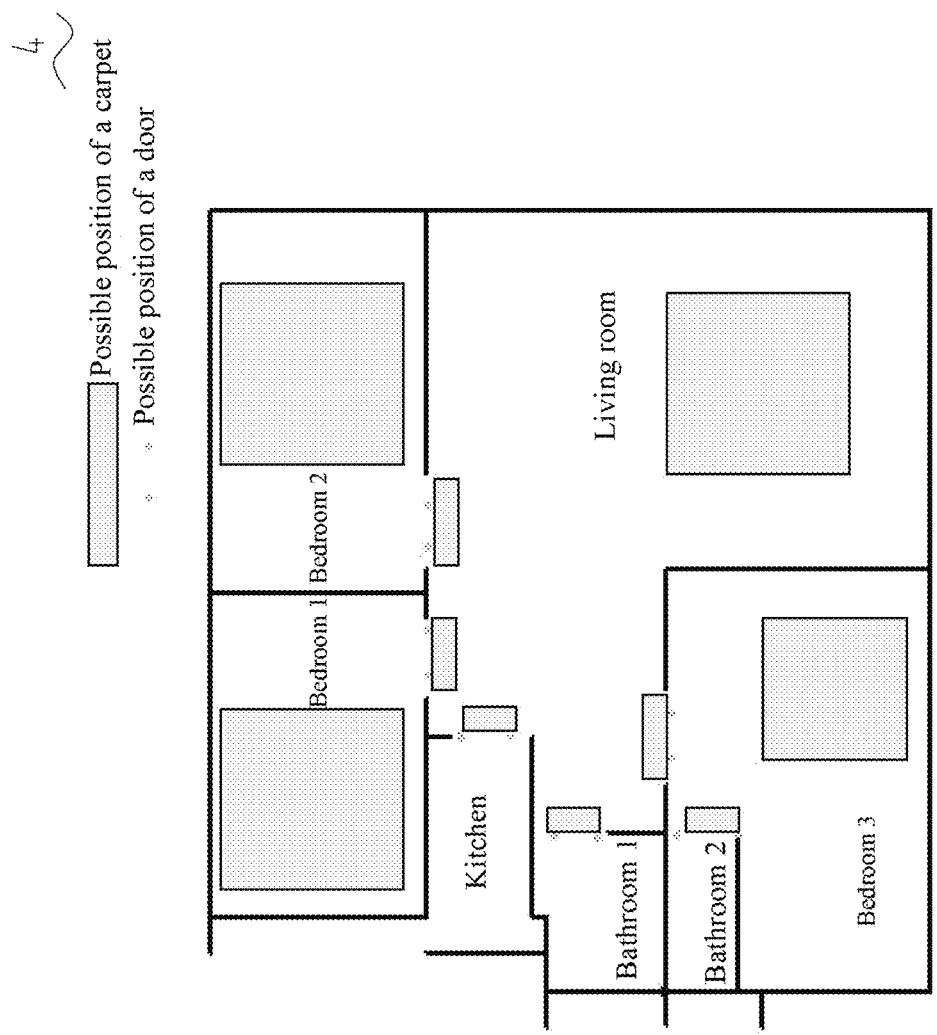

As shown in FIG. 8 and FIG. 9, when the cleaning robot is specifically an indoor cleaning robot, the global map 4 may be an indoor floor layout plan of a user. The global map 4 may include: a traveling region 41 such as a living room, a bedroom, a bathroom, or a kitchen, and an entrance/exit region 42 for entering or leaving the traveling region 41, where the entrance/exit region is usually a region in which a door (or doorway) is located. In addition, a boundary 43 of a non-entrance/exit region may be further disposed in the global map 4. The boundary 43 of the non-entrance/exit region may vary according to different application environments. For example, for the indoor cleaning robot, the boundary 43 of the non-entrance/exit region may be a wall. The traveling region 41 may be a region that may need to be cleaned by the cleaning robot. For the indoor cleaning robot, the traveling region 41 may be a region other than the wall in a floor plan of the user.

Specifically, there may be at least two traveling regions 41, which may include a first traveling region 41(*a*) and a second traveling region 41(*b*). The entrance/exit region 42 is disposed between the first traveling region 41(*a*) and the second traveling region 41(*b*). That is, the entrance/exit region 42 mainly refers to a junction of the two traveling regions 41. The entrance/exit region 42 may be determined by using a pattern of the global map 4 or may be designated by using an APP of the user. For the indoor cleaning robot, the entrance/exit region 42 mainly refers to a region of a door.

The cleaning robot further includes a cleaning device. In this embodiment, the cleaning device includes a wiping and/or washing device. For example, when the cleaning robot is a mopping machine or a mopping, sweeping, and vacuuming integrated machine, the cleaning robot may be further provided with a mopping assembly 2. The mopping assembly 2 may be fixed on the body 1 by using a lifting device. The mopping assembly 2 may be designed to be mounted on/unloaded from the body without any tool. When a mopping function needs to be performed, the mopping assembly 2 may be lowered by using the lifting device until the mopping assembly is in contact with the ground. Specifically, a cleaning component, which mainly plays the mopping role, of the mopping assembly 2 may be in the form of a mop. Certainly, the mopping assembly 2 may be alternatively a sponge or in another specific form. This is not specifically limited in this application.

The control device, electrically connected to the detection device 3 and the positioning device 5, obtains signals obtained by signal obtaining elements such as the detection device 3 and the positioning device 5, and then sends corresponding control instructions based on the obtained signals and stored computer-executable instructions.

The control device can determine a position of the cleaning robot in the map according to position information of the cleaning robot. Specifically, the control device may perform multi-angle comparison on current position information of the cleaning robot obtained by the positioning device in the global map 4 when labeling a position of the cleaning robot in the map, to accurately determine a current position of the cleaning robot in the map.

In this embodiment, the control device recognizes a ground feature 44 in front of the cleaning robot according to a detection result of the detection device 3, and controls, according to the position of the cleaning robot in the map, the cleaning robot to perform a corresponding action. Specifically, the recognizing, by the control device, a ground feature 44 in front of the cleaning robot according to a detection result of the detection device 3 includes: recognizing whether the ground feature 44 is a carpet. Correspondingly, the controlling, by the control device, the cleaning robot to perform a corresponding action includes: controlling the cleaning robot not to enter a region in which the carpet is located, or to pass through a region in which the carpet is located.

For example, in one case, when recognizing the ground feature as a carpet and when determining, according to the position information of the cleaning robot, that the cleaning robot is beyond a range of a first predetermined distance to the entrance/exit region, the control device controls the cleaning robot not to enter a region in which the carpet is located, to prevent the cleaning robot from contaminating the carpet.

In another case, when recognizing the ground feature as the carpet and when determining, according to the position information of the cleaning robot, that the cleaning robot is within a range of a second predetermined distance to the entrance/exit region, the control device controls the cleaning robot to pass through the region in which the carpet is located, to avoid a case that after recognizing the carpet, the cleaning robot does not enter the region in which the carpet is located and is limited by a single traveling region, and as a result, the cleaning robot cannot move to different traveling regions to perform cleaning work within a global map range.

In this embodiment, the first predetermined distance may be between 50 cm and 100 cm. Specifically, a value range of the first predetermined distance may be determined according to an actual application scenario. For example, for a general user family, a carpet may be placed at a door, and a position of the carpet has a particular deviation range near the door. In this case, a region within the range of the first predetermined distance beyond the door may be set to a region in which the carpet may exist. When a carpet is recognized in the region, the cleaning robot passes through the region and enters a new traveling region.

The range of the second predetermined distance may be determined according to an actual application scenario. For example, for a general user family, a carpet may be placed at a door, and a position of the carpet has a particular deviation range near the door. In this case, a region within the range of the second predetermined distance beyond the door may be set to a region in which the carpet may exist. When a carpet is recognized in the region, the cleaning robot passes through the region and enters a new traveling region 41.

On the whole, the second predetermined distance may be the same as the first predetermined distance and may be between 50 cm and 100 cm. In addition, the second predetermined distance may be different from the first predetermined distance, for example, may be set according to an actual size of a doorway. This is not specifically limited in this application. In this embodiment, there is an overlapping part between a part beyond the range of the first predetermined distance and a part within the range of the second predetermined distance.

Figure 5:
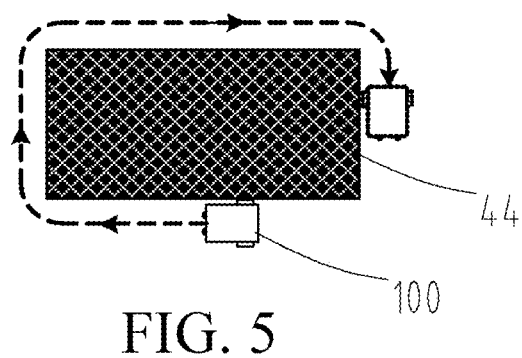
FIG. 5, FIG. 6, and FIG. 7 are schematic diagrams of a movement of a cleaning robot after recognizing a carpet according to an embodiment of the present invention.
Figure 6:
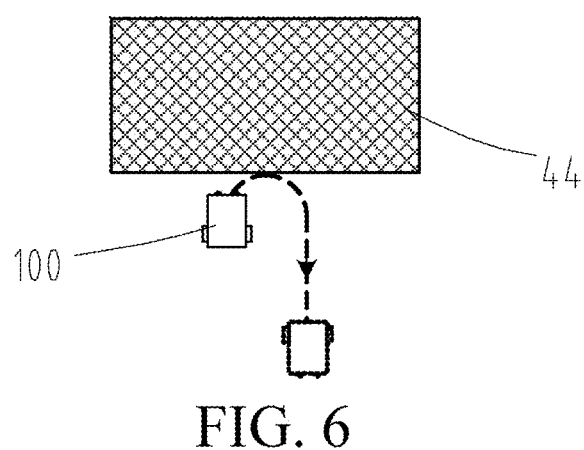
Figure 7:
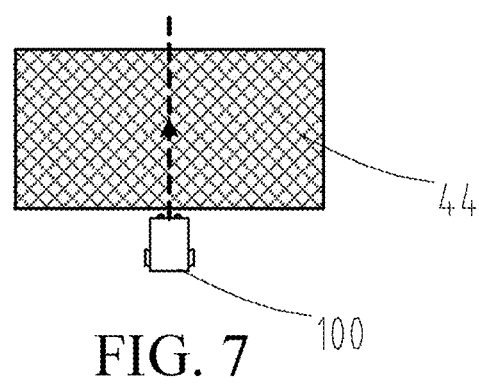

In this embodiment, the controlling, by the control device, the cleaning robot not to enter a region in which the carpet is located includes: controlling the cleaning robot to drive away from the carpet, or controlling the cleaning robot to move along an edge of the carpet. FIG. 5 through FIG. 7 are schematic diagrams of several movement actions of the cleaning robot when encountering a carpet. As shown in FIG. 5, in one case, the cleaning robot moves along an edge of the carpet after encountering the carpet, to clean a region of the edge of the carpet, and after cleaning the edge of the carpet, the cleaning robot returns to a breakpoint position in which the carpet is detected and continues to move along a previous path (for example, a zigzag-shaped path). As shown in FIG. 6, in one case, the cleaning robot drives away from the carpet after encountering the carpet, to avoid contaminating the carpet. Specifically, the cleaning robot turns back, for example, turns back along the zigzag-shaped path. As shown in FIG. 7, in one case, the cleaning robot passes through the carpet after encountering the carpet and enters a next traveling region for cleaning, to complete cleaning work within a global map range.

In this embodiment, the cleaning robot includes an intra-region movement mode and a cross-region movement mode. In the intra-region movement mode, the control device controls the cleaning robot to move in one traveling region and perform cleaning work. In the intra-region movement mode, when recognizing the ground feature as a carpet, the control device controls the cleaning robot not to enter a region in which the carpet is located. In the intra-region movement mode, when the cleaning robot detects a carpet, regardless of a distance between the cleaning robot and the entrance/exit region, the cleaning robot avoids the carpet to perform the cleaning work. Specifically, the cleaning robot may move along an edge of the carpet, or move back, or the like. In this way, the cleaning robot can remain in a traveling region to continuously perform the cleaning work, and complete the cleaning work of the traveling region.

In the cross-region movement mode, the control device controls the cleaning robot to enter, from one traveling region, another traveling region through the entrance/exit region. In the cross-region movement mode, when recognizing the ground feature as carpet and when determining, according to position information of the cleaning robot, that the cleaning robot is within a range of a second predetermined distance to the entrance/exit region, the control device controls the cleaning robot to pass through a region in which the carpet is located, to enter the another traveling region from the one traveling region. After completing cleaning work of a traveling region, the cleaning robot enters the cross-region movement mode. The cleaning robot moves to the entrance/exit region according to position information of the cleaning robot and based on the map and passes through the entrance/exit region, to enter another to-be-cleaned traveling region for working. When the cleaning robot detects a carpet and the cleaning robot is within the range of the second predetermined distance to the entrance/exit region, the cleaning robot passes through a region in which the carpet is located, to enter another traveling region. When the cleaning robot detects carpet, but the cleaning robot is beyond the range of the first predetermined distance to the entrance/exit region, the cleaning robot does not enter the region in which the carpet is located. Specifically, the cleaning robot may bypass the carpet, to avoid contaminating the carpet. In this way, the cleaning robot can not only complete the cleaning work within the global map range, but also make the cleaning work achieve clean and efficient effects.

Figure 10:
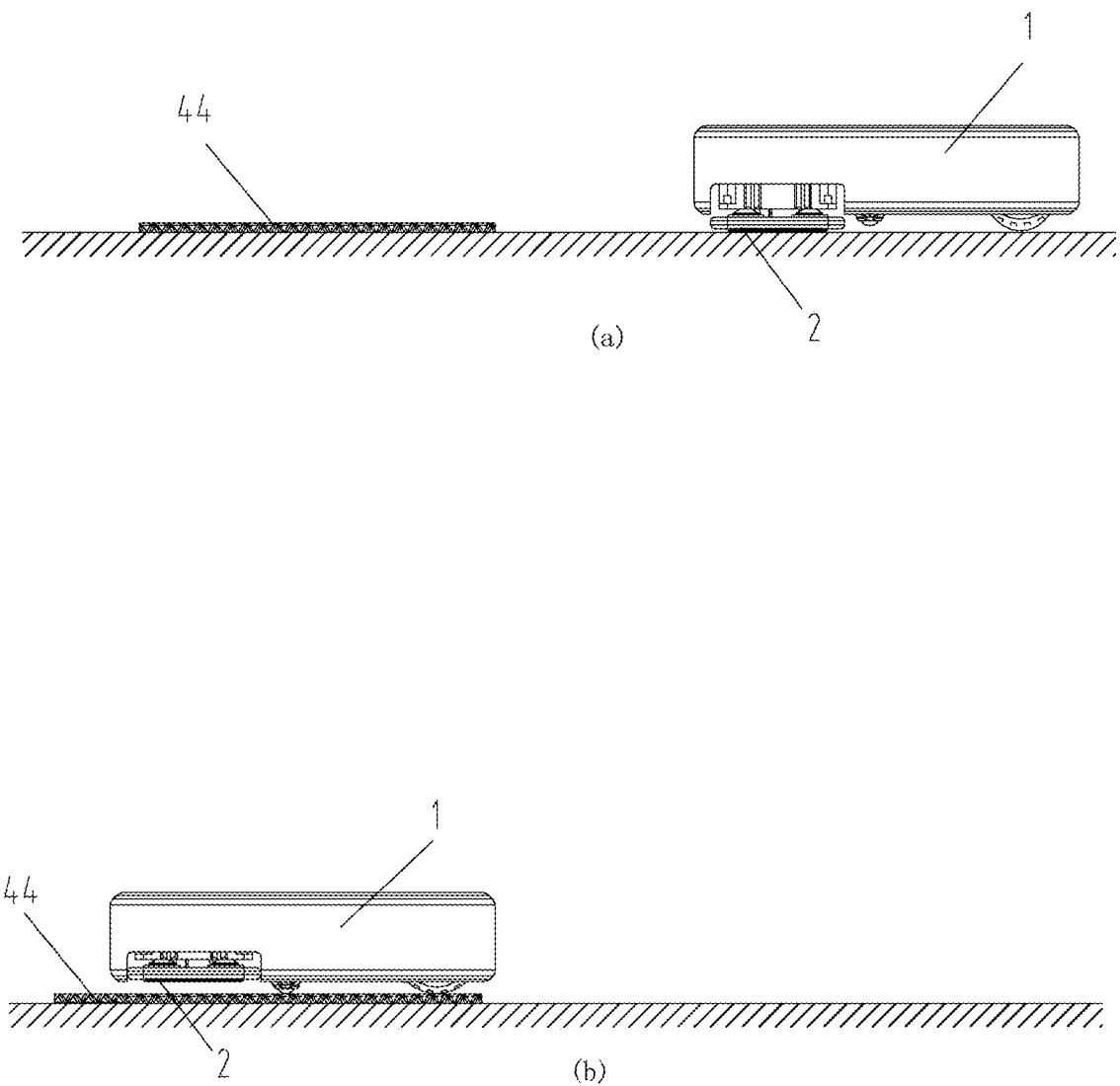
FIGS. 10(a) and 10(b) are schematic diagrams in which a mopping assembly is lifted according to an embodiment of the present invention.

Referring to FIG. 10, when the detection device detects the carpet, the control device can further control a mopping assembly lifting device to lift the mopping assembly 2, to avoid being in contact with the carpet. Especially when the cleaning robot needs to pass through the region in which the carpet is located and enter a next traveling region, the lifting device is controlled to lift the mopping assembly 2 to a position higher than the carpet, and then the cleaning robot passes through the carpet, to prevent a mop in the mopping assembly 2 from dirtying the carpet.

According to the cleaning robot provided in this embodiment, the ground feature 44 in front of the cleaning robot can be recognized according to a detection result of the detection device. In a traveling and working process, the cleaning robot can label a position in a map in real time by using position information obtained by a positioning device and the map of a working region of the cleaning robot, and perform a corresponding action according to the position labeled in the map, thereby achieving different functions, so that the degree of intelligence is high, and the usage reliability is high, thereby greatly improving comprehensive user experience.

Specifically, for different positions of the cleaning robot in the map, the following different control actions are adopted:

1. When the cleaning robot is near a non-entrance/exit region and the detection device senses a carpet in a forward direction, the cleaning robot does not enter a front region, so that the carpet can be prevented from being dirtied.

2. When the cleaning robot is near an entrance/exit region (e.g., door) and the detection device 3 senses a carpet in a forward direction, the mopping assembly 2 is lifted, and the cleaning robot enters a front region, so that the cleaning robot can move to different traveling regions and perform cleaning work within a global map range without being limited by a single traveling region, and the carpet is not dirtied.

Figure 11:
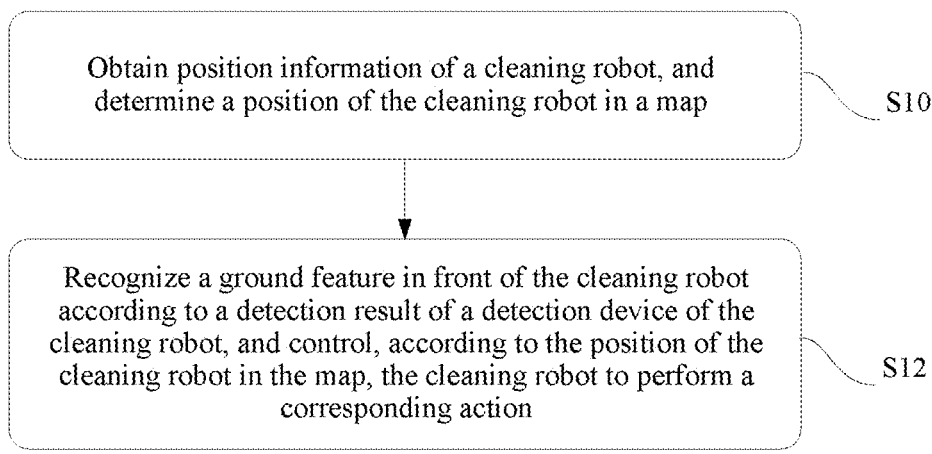
FIG. 11 is a flowchart of steps of a control method for a cleaning robot according to an embodiment of the present invention.

As shown in FIG. 11, for the foregoing cleaning robot, this application further correspondingly provides a control method for a cleaning robot. Specifically, the control method for a cleaning robot may include the following steps.

Step S10. Obtain position information of the cleaning robot, and determine a position of the cleaning robot in the map according to the position information of the cleaning robot.

Step S12. Recognize a ground feature 44 in front of the cleaning robot according to a detection result of a detection device of the cleaning robot, and control, according to the position of the cleaning robot in the map, the cleaning robot to perform a corresponding action.

It should be noted that the control method for a cleaning robot may be applicable to different scenarios according to different ground features 44 ahead. In this embodiment, a description is made by using carpet recognition as an example. Another form of the ground feature 44 ahead may be adjusted adaptively according to a recognition method provided in this application.

Figure 12:
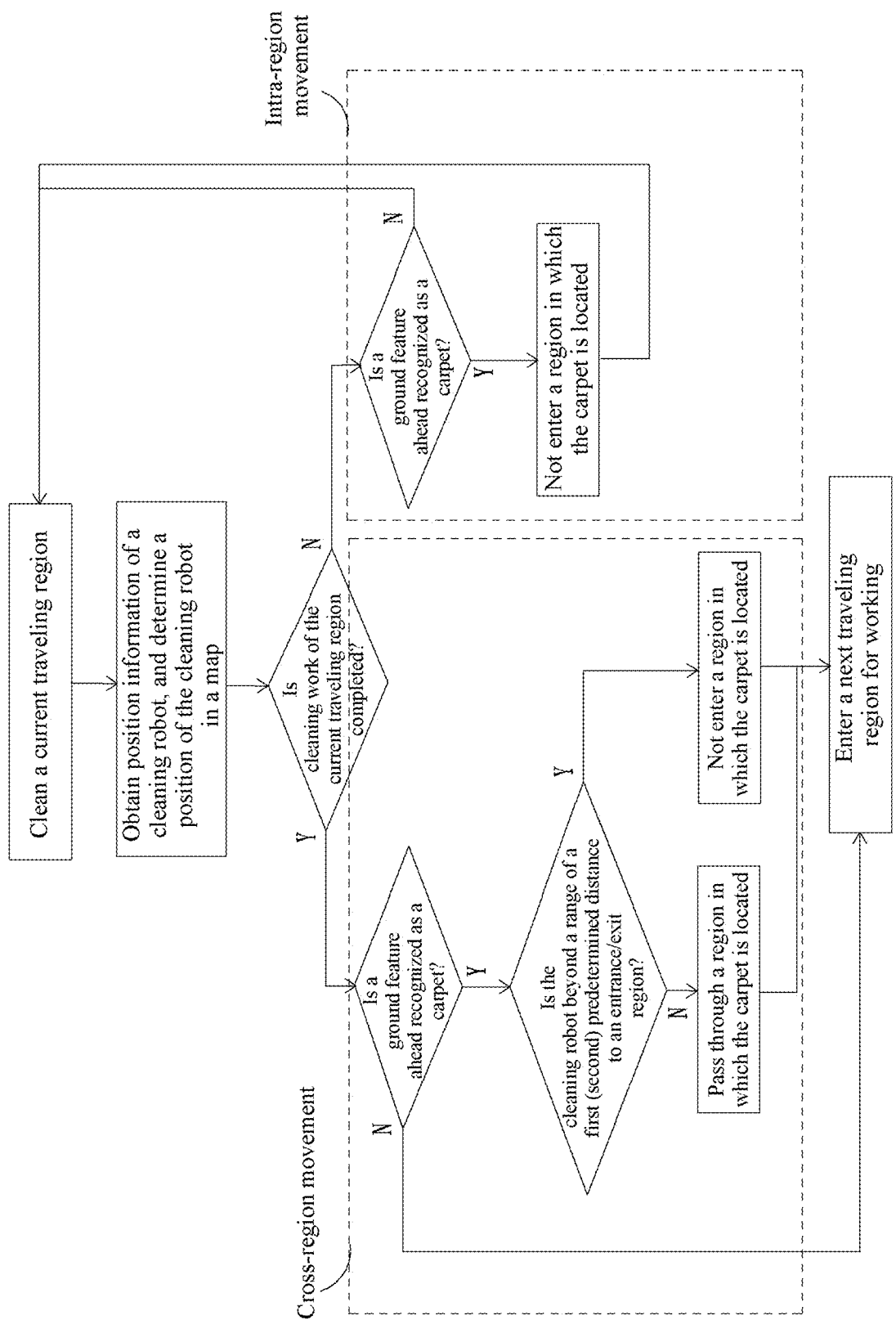
FIG. 12 is a flowchart of steps of a control method for a cleaning robot according to an embodiment of the present invention.

In this embodiment, for specific steps of the control method for a cleaning robot, reference may be made to the foregoing description. Details are not described herein again. FIG. 12 is a flowchart of a control method for a cleaning robot according to this embodiment. In FIG. 12, for example, the first predetermined distance is the same as the second predetermined distance.

This application further provides a detection device for detecting a carpet and a corresponding method.

Figure 13:
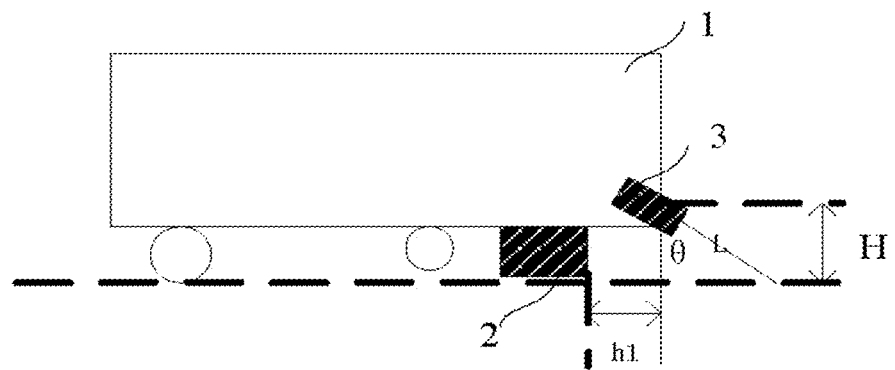
FIG. 13 is a schematic structural diagram of a cleaning robot according to another embodiment of the present invention.
Figure 14:
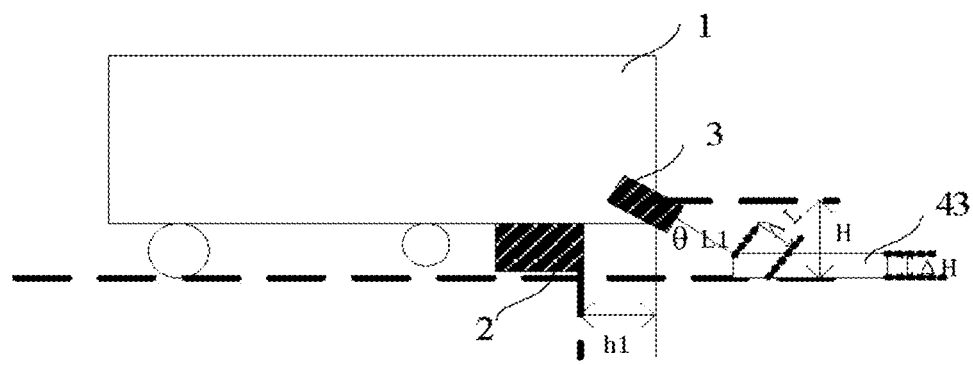
FIG. 14 is a schematic diagram in which the cleaning robot in the embodiment shown FIG. 13 recognizes a carpet.
Figure 15:
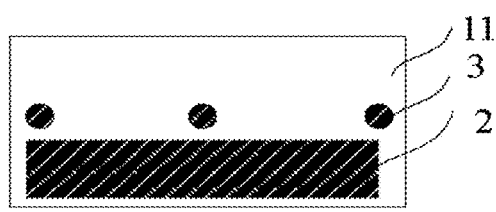
FIG. 15 is a schematic distribution diagram of a detection device on a forward direction side of the cleaning robot in the embodiment shown FIG. 13.

Referring to FIG. 13 through FIG. 15, in one embodiment, the detection device 3 includes a ranging sensor, and the ranging sensor may be a time of flight (TOF) sensor or a triangular ranging sensor. The TOF sensor is briefly referred to as TOF, which mainly implements distance measurement by using a time of flight technology. A basic principle of the time of flight technology is that a light emitting element is loaded, and photons emitted by the light emitting element are reflected back after hitting a surface of an object. The photons emitted by the light emitting element and reflected from the surface of the object are captured by using a special CMOS sensor, and times of flight of the photons can be obtained. Distances of flight of the photons may be calculated according to the times of flight of the photons, that is, height (depth) information of the object is obtained. The body 1 may include a housing having a front surface 11 in a forward direction. The detection device 3 may be disposed on the front surface 11. In this embodiment, the detection device 3 is disposed on the body 1 and is configured to detect a ground feature 44 in front of the cleaning robot. The ground feature 44 ahead may include a convex feature or a concave feature relative to a current ground on which the cleaning robot is located. When the ground feature 44 ahead is the convex feature, correspondingly, the detection device 3 is mainly configured to determine a height of a to-be-traveled region ahead, including a height of a ground without any object ahead and a height of an object when there is the object ahead. There may be one detection device 3. When there is one detection device 3, the detection device 3 may be disposed in the middle of the front surface 11. There may be alternatively two or three detection devices 3. At least two detection devices 3 are distributed on a side edge of the front surface 11 and are at the same height. For example, when there are two detection devices 3, the two detection devices 3 are distributed on the side edge of the front surface 11 and are at the same height. When there are three detection devices 3, two of the three detection devices 3 are distributed on the side edge of the front surface 11, one detection device is located in the middle of the front surface 11, and the three detection devices 3 are at the same height. When at least two detection devices 3 are disposed on the side edge of the front surface 11, it can be ensured that the robot can recognize the ground feature 44 ahead as soon as possible before entering the ground feature 44 ahead from different angles.

In this embodiment, the detection device 3 has a detection direction. A range of an angle θ between the detection direction and a vertical direction is between 0 degrees and 90 degrees, to ensure that the cleaning robot may recognize the ground feature 44 ahead in advance before entering the ground feature 44 ahead, and then perform a corresponding control operation.

Theoretically, a mounting angle (an angle between the detection direction and a gravity direction) of the detection device 3 may be any angle between 0 degrees and 360 degrees. To ensure that the detection device 3 can detect the ground feature 44 ahead, the angle θ between the detection direction of the detection device 3 and the vertical direction needs to be between 0 degrees and 90 degrees. Preferably, the mounting angle of the detection device 3 is consistent with the angle θ between the detection direction and the vertical direction, and is between 0 degrees and 90 degrees. When the mounting angle of the detection device 3 is between 90 degrees and 360 degrees, a reflection structure may be added. That the angle θ between the detection direction of the detection device 3 and the vertical direction needs to be between 0 degrees and 90 degrees is implemented through a light path reflection principle.

In addition, the mopping assembly 2 is located behind the front surface 11 in the forward direction. A distance between the mopping assembly and the front surface is h1 in the forward direction. Even when the detection device 3 is mounted vertically and detects the ground feature 44 ahead, the control device can still control in time the mopping assembly 2 to perform a lifting action or a braking action, so that the mopping assembly 2 is not in contact with the ground feature 44 ahead.

The control device can label a reference height of a current traveling region 41 and obtain a height parameter of the detection device 3.

Specifically, the control device stores a computer-executable instruction. Based on an obtained signal and the stored computer-executable instruction, when a carpet is sensed by the detection device 3, it indicates that there is a specific ground feature 44 ahead.

Further, to improve the accuracy of the recognition of the ground feature 44 ahead, the detection device 3 senses, in the forward direction, a convexity of which a height exceeds a preset value, and detects that a length of the convexity exceeds a predetermined length, and it indicates that there is the ground feature 44 ahead. When detecting the length of the convexity in the forward direction, the detection device 3 may determine the length of the convexity according to a time of detecting the convexity of which the height exceeds the preset value in combination with a traveling speed of the cleaning robot, and then compare the determined length of the convexity with the predetermined length, to determine whether the detected length of the convexity exceeds the predetermined length. Certainly, the detection device 3 can alternatively directly measure the length of the convexity in the forward direction, and subsequently compare the detected length of the convexity with the predetermined length, to determine whether the detected length of the convexity exceeds the predetermined length. Certainly, a manner of detecting the length of the convexity in the forward direction is not limited to the foregoing example. This is not specifically limited in this application.

In one embodiment, the detection device 3 obtains, by detecting a distance between the cleaning robot and the ground, a height parameter representing a height of the ground, and the control device recognizes the ground feature 44 according to a result of comparison between the height parameter and a preset value.

In this embodiment, the height parameter may include a height value or a distance value in the detection direction. When the height parameter is the height value, it may be specifically a height difference ΔH between the detected highest point of the ground feature 44 ahead and a reference ground. When the height parameter is the distance value in the detection direction, it may be specifically a difference ΔL between a distance reference value L in the detection direction and an actual measured distance value L1.

ΔH=ΔL×COS θ. If a manner of comparing ΔH with a preset value is adopted, the preset value is specifically a preset height value, and when ΔH exceeds the preset height value, it indicates that the ground feature 44 ahead is recognized.

In addition, if a manner of comparing ΔL with a preset value is adopted, the preset value is a preset distance value, and when ΔL exceeds the preset distance value, it indicates that the ground feature 44 ahead is recognized. When the preset value is the preset distance value, the detection device 3 may be obliquely disposed on the body 1 at a particular angle to the vertical direction.

In the following embodiments, a description is made mainly by using a height value as an example. For the distance value in the detection direction, reference may be made to the height value by analogy. Details are not described again in this application.

Specifically, the preset value includes a first preset value. The detection device 3 detects that a height value of the ground feature is greater than the first preset value, and the control device recognizes the ground feature 44 ahead as a carpet. Generally, the ground in the room of the user is a ground type such as a floor or a tile with better flatness. When the cleaning robot is located in a traveling region 41 in which the ground feature 44 ahead is located, the first preset value may be determined according to a height of the ground feature 44 ahead (or a size in a height direction). For example, when the ground feature 44 ahead is a carpet, a thickness of the carpet is generally more than 5 mm, and the first preset value may be alternatively set to 5 mm.

In addition, the carpet generally has a particular size, and the size may be determined according to a shape and a position of the carpet. This is not specifically limited in this application. However, the size of the carpet has at least a predetermined length in a traveling direction of the cleaning robot. Therefore, the predetermined length may be stored in the control device, for example, the predetermined length may be 2 cm.

When the cleaning robot provided in this embodiment is in a mopping mode, the detection device 3 senses a convexity of which a height exceeds the first preset value near the non-entrance/exit region in the forward direction, and it indicates that the ground feature 44 ahead (for example, the carpet) is recognized. Further, to improve the accuracy of the recognition of the ground feature 44 ahead, the detection device 3 senses, in the forward direction, the convexity of which the height exceeds the first preset value, and detects that a length of the convexity exceeds a predetermined length, and it indicates that there is the ground feature 44 ahead.

The cleaning robot provided in this application recognizes the ground feature 44 ahead mainly based on a physical size of the ground feature 44 ahead. Compared with other recognition manners in the prior art, not only the recognition reliability is higher, but also no virtual forbidden region needs to be set, thereby greatly improving the user usage experience.

In addition, the cleaning robot provided in this application can further perform different actions correspondingly after recognizing the ground feature 44 ahead in another position.

In another case, when a current to-be-traveled region is a concave region, the cleaning robot provided in this application has an anti-falling function.

The preset value includes a second preset value. When the detection device 3 detects that the height parameter of the ground feature 44 is less than the second preset value, the control device recognizes the ground feature 44 as a cliff and controls the cleaning robot not to enter a region in which the cliff is located.

In this embodiment, the second preset value is mainly used for evaluating a degree of concavity of the current to-be-traveled region. Specifically, the second preset value may be a negative number less than 0. The second preset value may be specifically determined according to performance (for example, an obstacle crossing capability) of the cleaning robot. For example, the second preset value may be −15 cm, or certainly may be another value. This is not specifically limited in this application. When the height parameter is less than the second preset value, it indicates that the cleaning robot has the risk of failing to work normally after falling.

In still another case, referring to the global map 4, the global map 4 further includes a boundary 43 of a non-entrance/exit region. When it is recognized that a current position is within a third predetermined distance to the boundary 43, the detection device 3 is shielded, and the cleaning robot is controlled to continue to work.

In this embodiment, the boundary 43 may be a wall, and a description is made below by using the wall as an example. The third predetermined distance may be 5 cm, and a specific value of the third predetermined distance is not limited to 5 cm. This is not specifically limited in this application. When the cleaning robot moves to a position within the third predetermined distance to the wall, the detection device 3 is shielded, to avoid a case that the cleaning robot considers the wall as the ground feature 44 ahead and does not continue to approach. After the detection device 3 is shielded, the cleaning robot continues to move forward to clean a corner of the wall.

In this embodiment, the detection device 3 generally needs to calibrate a height parameter before working.

In this embodiment, a reference height of a current traveling region 41 may be calibrated before the cleaning robot is controlled to travel, and the height parameter of the detection device 3 is obtained. Specifically, the obtained height parameter of the detection device 3 is mainly used for providing a comparison reference for calculating a height of a ground feature 44 ahead in the current traveling region 41, and specifically for providing an initial calculation point for measuring a height of the ground feature 44 ahead.

The height parameter may include a distance reference value L in the detection direction, or certainly, the height parameter may be a height reference value H in the vertical direction. During specific calibration, an example in which the height parameter is the distance reference value L is used, and when the cleaning robot is horizontally still at a reference surface, N groups of data may be obtained, and then an average value of the N groups of data may be used as the distance reference value L.

A moment of the calibration may be set according to different application scenarios. For example, the cleaning robot may automatically perform calibration in a base station after each time of returning to the base station; or each time leaving a base station for working, the cleaning robot may first perform calibration near the base station and then work; or the cleaning robot first automatically performs calibration after startup; or the cleaning robot first performs calibration and then works after entering different regions in the map; or after the mopping assembly 2 is replaced, or the mopping assembly 2 is lifted, or the cleaning robot gets out of trouble, the cleaning robot may perform calibration, to improve the accuracy of the detection.

In this embodiment, when determining whether the ground feature 44 ahead is a carpet, the control device subtracts the actually measured distance value L1 from the distance reference value L to obtain ΔL.

When ΔL>0, it indicates that the ground feature is a convexity relative to a reference ground, and a vertical distance of the convexity is $\Delta H = \Delta L \times \cos\theta$.

When ΔL<0, it indicates that the ground feature is a concavity relative to the reference ground, and a vertical distance of the concavity is $\Delta H = \Delta L \times \cos\theta$.

If the height of the convexity is greater than a preset value (for example, 5 mm), it indicates that the ground feature 44 (e.g., a carpet) ahead is recognized.

When it is determined that the preset value is 5 mm preferably, it is mainly considered that actual heights of most carpets are greater than 5 mm and fluctuation of the ground in the home is less than the value, and meanwhile, a price-performance ratio of a current sensor is considered. If the height of the concavity is greater than an obstacle crossing height, the robot does not enter the concavity.

The cleaning robot provided in this application recognizes the ground feature 44 ahead mainly based on a physical size of the ground feature 44 ahead. Therefore, compared with other recognition manners in the prior art, during use, the cleaning robot can reliably recognize ground features ahead including the carpet and no virtual forbidden region needs to be set.

When the cleaning robot is within a particular distance to the boundary 43, the detection device 3 is shielded, and the cleaning robot is controlled to continue to clean, so that the cleaning robot can clean a corner region of the boundary 43 without any dead angle.

When recognizing the ground feature 44 ahead as a cliff, the cleaning robot may not enter a region in which the cliff is located, to prevent the cleaning robot from falling.

Further, for a case that the cleaning robot does not enter a front region, by controlling a mounting angle of the detection device 3, the ground feature 44 ahead may be recognized in advance by a particular distance, so that the cleaning robot can be more reliably prevented from entering the front region such as a carpet or a cliff that is not at the door.

Certainly, the cleaning robot provided in this embodiment can not only recognize the ground feature 44 ahead such as the carpet, but also adjust the first preset value and a value of the predetermined length according to actual requirements, to recognize a ground feature 44 ahead with another size. However, examples are not described again one by one in this application.

In this embodiment, a reference height of a current traveling region 41 may be calibrated before the cleaning robot is controlled to travel, and the height parameter of the detection device 3 is obtained. Specifically, the obtained height parameter of the detection device 3 is mainly used for providing a comparison reference for calculating a height of a ground feature 44 ahead in the current traveling region 41, and specifically for providing an initial calculation point for measuring a height of the ground feature 44 ahead.

In this specification, the detection device 3 obtains, by detecting a distance between the cleaning robot and the ground feature 44 ahead, a height parameter representing a height of the ground feature 44 ahead, and the control device recognizes the ground feature 44 ahead according to a result of comparison between the height parameter and a preset value. Subsequently, the control device controls, according to a position of the cleaning robot labeled in the map, the cleaning robot to perform a corresponding action.

In this embodiment, when the cleaning robot is beyond the range of the first predetermined distance to the entrance/exit region 42, the detection device 3 senses a convexity of which a height exceeds the first preset value in the forward direction, and it may indicate that the ground feature 44 ahead is recognized as a carpet.

Further, to improve the accuracy of the recognition of the ground feature 44 ahead, determining may be performed according to a consecutive distance of the convexity. Specifically, based on a case that it is sensed that the protrusion of which the height exceeds the first preset value, the length of the protrusion may be superimposed to exceed the first predetermined length, and it indicates that the ground feature 44 ahead is recognized.

When the cleaning robot provided in this embodiment is in a mopping mode, the detection device 3 senses a convexity of which a height exceeds the first preset value (for example, 5 mm) near the non-entrance/exit region in the forward direction, the consecutive distance of the convexity exceeds a predetermined length (for example, 2 cm), and it indicates that the ground feature 44 ahead (for example, the carpet) is recognized. The cleaning robot provided in this application recognizes the ground feature 44 ahead mainly based on a physical size of the ground feature 44 ahead. Compared with other recognition manners in the prior art, during use, the cleaning robot can recognize the ground feature 44 (for example, the carpet) ahead, and the recognition reliability is higher; and moreover, no virtual forbidden region needs to be set, thereby greatly improving the user usage experience.

In another case, when determining, according to the position information of the cleaning robot, that the cleaning robot is within the range of the second predetermined distance to the entrance/exit region, the control device controls the cleaning robot to pass through the region in which the carpet is located.

An example in which the entrance/exit region 42 is mainly a door is used for description below. That is, when the cleaning robot detects a carpet near the door, the cleaning robot is controlled to pass through a region in which the carpet is located.

Specifically, the detection device 3 detects that a height value of the ground feature 44 is greater than a first preset value, and the control device recognizes the ground feature 44 as the carpet. In this case, when determining, according to the position information of the cleaning robot, that the cleaning robot is within the range of the second predetermined distance to the entrance/exit region, the control device controls the cleaning robot to pass through the region in which the carpet is located.

For a junction of two traveling regions 41, corresponding ground heights may be different. In this case, to avoid misjudgment of the detection device 3 and to ensure that the cleaning robot can smoothly enter and leave different traveling regions 41 to fully clean the working region, even if it is determined that there is the ground feature 44 ahead within the range of the second predetermined distance to the entrance/exit region 42, the cleaning robot is still controlled to pass through a region in which the ground feature 44 ahead is located.

The first preset value may be comprehensively determined according to a height of the ground feature 44 ahead in combination with a current height parameter of the detection device 3. Calculation is performed with a ground of a current region in which the detection device 3 is located as a zero point, and the first preset value is less than or equal to the height of the ground feature 44 ahead. Generally, the cleaning robot has an obstacle crossing height, which is calculated by using the ground of the current region in which the detection device 3 is located as the zero point, and the first preset value is less than the highest obstacle crossing height of the cleaning robot.

Further, the control method for a cleaning robot may further include: lifting the mopping assembly 2 when a convexity of which a height exceeds a preset value is sensed in a forward direction. The mopping assembly 2 may be specifically a mop, a sponge, or the like, or certainly, the mopping assembly may be in another form. This is not specifically limited in this application. A description is made below by using the mop as an example. A lifted height of the mop is at least equal to a preset value, which helps to further perform a corresponding action according to an instruction of the control device. For example, when the ground feature 44 ahead needs to be crossed, the mopping assembly 2 may be controlled to be lifted again, and then the ground feature 44 ahead is passed through again. When the ground feature 44 ahead needs to be avoided, the mop is lifted, which helps the cleaning robot to re-plan a moving route. In addition, in some special cases, for example, when the cleaning robot fails to brake or the route is planned incorrectly, direct contact between the mop and the carpet may be also avoided.

In another embodiment, the detection device 3 has a detection direction, a height parameter of the detection device 3 includes a distance reference value L in the detection direction, and an angle between the detection direction and a vertical direction is θ.

A formula for calculating a height value ΔH of the ground feature 44 is:

$$\Delta H = \Delta L \times \cos\theta$$

where ΔL is a difference between the distance reference value L and an actually measured distance L1 in the detection direction.

For example, when the distance reference value L=50 mm, the actually measured distance value L1=38 mm, θ=38 degrees, and a preset value is 6 mm, ΔH=ΔL×COS θ=12× COS 38°=9.5 mm.

Because ΔH is greater than the preset value, it is determined that the ground feature 44 (e.g., a carpet) ahead is recognized.

In one embodiment, a range of the angle θ between the detection direction and the vertical direction is between 0 degrees and 90 degrees. In this embodiment, to ensure that information about the ground ahead is predicted, the detection device 3 may be optionally a detection device 3 that can be mounted in a non-vertical manner, for example, a TOF detection device 3. When the detection device 3 is mounted obliquely downward as a whole, a detected distance may be advanced by a particular distance N. On the one hand, a braking distance can be ensured, and on the other hand, the wall can be effectively treated differently. For example, when N=5 cm, the detection device 3 is shielded within 5 cm from the wall, to avoid incorrectly recognizing the wall as a carpet.

In an embodiment, the cleaning robot further has an obstacle crossing function. Correspondingly, the control method for a cleaning robot may further include: controlling, when the detection device 3 senses that there is a convexity or a concavity of which a height exceeds the highest obstacle crossing height in a current to-be-traveled region in the forward direction, the cleaning robot not to enter the to-be-traveled region ahead. The highest obstacle crossing height may be 15 mm. Certainly, according to different specific types and sizes of the cleaning robot, the highest obstacle crossing height may be adjusted according to actual requirements. This is not specifically limited in this application.

When the current to-be-traveled region is a concave region, the cleaning robot provided in this application has an anti-falling function.

In a specific embodiment, the preset value includes a second preset value. When the detection device detects that the height value of the ground feature 44 is less than the second preset value, the control device recognizes the ground feature 44 as a cliff and controls the cleaning robot not to enter a region in which the cliff is located. For the second preset value, reference may be made to the specific description of the cleaning robot in the foregoing embodiment. Details are not described again in this application.

Referring to the global map 4, the global map 4 further includes a boundary 43 of a non-entrance/exit region. The method further includes: when it is recognized that a current position is within a third predetermined distance close to the boundary 43, shielding the detection device 3.

In this embodiment, the boundary 43 may be a wall, and a description is made below by using the wall as an example. The third predetermined distance may be 5 cm, and a specific value of the third predetermined distance is not limited to 5 cm. This is not specifically limited in this application. When the cleaning robot moves to the third predetermined distance close to the wall, the detection device 3 is shielded, to avoid a case that the cleaning robot considers the wall as the ground feature 44 ahead and does not continue to approach. After the detection device 3 is shielded, the cleaning robot continues to move forward to clean a corner of the wall.

In a main application scenario, a mopping, sweeping, and vacuuming integrated cleaning robot has an automatic charging function, and a charging base station of the cleaning robot is generally disposed at a position away from a door. Therefore, when the cleaning robot works, an initial position is generally not near the door by default. After the cleaning robot is started, the detection device 3 senses a convexity of which a height exceeds a preset value (for example, 5 mm) in a forward direction, a consecutive distance of the convexity exceeds a predetermined length (for example, 2 cm), and it indicates that a ground feature 44 ahead (for example, a carpet) is recognized. The cleaning robot provided in this application recognizes the ground feature 44 ahead mainly based on a physical size of the ground feature 44 ahead. Compared with other recognition manners in the prior art, during use, the cleaning robot can recognize the carpet, and the recognition reliability is higher; and moreover, no virtual forbidden region needs to be set, thereby greatly improving the user usage experience.

It should be noted that, in the descriptions of this application, terms "first" and "second" are only used to describe the objective and distinguish similar objects without a limitation on a sequence between the two, and cannot be understood as indicating or implying relative importance. In addition, in the description of this application, unless otherwise stated, "a plurality of" means two or more than two.

The foregoing embodiments are all described in a progressive manner. For same or similar parts in the embodiments, cross reference is made, and descriptions of each embodiment focus on a difference from other embodiment.

The foregoing descriptions are merely several embodiments of the present invention. Although the embodiments disclosed in the present disclosure are described above, the content of the embodiments is only used to facilitate the understanding of the present embodiments, and is not intended to limit the embodiments of the present invention. Any person skilled in the art of the present embodiments can make any modification and change in the form and details of the embodiments without departing from the spirit and scope of the present embodiments. However, the protection scope of the present embodiments should still be subject to the scope defined by the appended claims.

What is claimed is:

1. A method of controlling a cleaning robot, the method comprising:
   driving the cleaning robot to move on a ground and performing cleaning work thereon;
   detecting a ground feature in front of the cleaning robot;
   obtaining position information of the cleaning robot;
   storing or obtaining a map of a working region of the cleaning robot;

determines a position of the cleaning robot within the map according to the position information of the cleaning robot, the map including a traveling region and an entrance/exit region for entering or leaving the traveling region;

recognizing the ground feature according to a detection result, the ground feature including a carpet, the recognizing the ground feature according to the detection result including recognizing the ground feature as the carpet;

controlling, according to the position of the cleaning robot in the map, based on a first location of the ground feature, the cleaning robot to perform a first corresponding action, the first corresponding action including:

in response to determining that the cleaning robot is located away from the entrance/exit region such that the carpet is located beyond a range of a first predetermined distance to the entrance/exit region, controlling the cleaning robot not to enter a region in which the carpet is located; and controlling, according to the position of the cleaning robot in the map, based on a second location of the ground feature, the cleaning robot to perform a second corresponding action, the first location being different from the second location, the second corresponding action being different from the first corresponding action.

2. The cleaning robot method according to claim 1, wherein the recognizing the ground feature as the carpet including:

obtaining, by detecting a distance between the cleaning robot and the ground, a height parameter representing a height of the ground; and recognizing the ground feature as the carpet in response to determining that the height parameter is greater than a first preset value.

3. The method according to claim 1, wherein the second corresponding action includes:

in response to determining that another carpet is located at the entrance/exit region such that the another carpet is within a range of a second predetermined distance to the entrance/exit region, controlling the cleaning robot to pass through a region in which the another carpet is located.

4. The method according to claim 3, further comprising:

prior to controlling the cleaning robot to pass through the region in which the another carpet is located, determining that the cleaning robot is in a cross-region movement mode instead of an intra-region movement mode, in the cross-region movement mode, controlling the cleaning robot to enter, from one traveling region, to another traveling region through the entrance/exit region; and in the intra-region movement mode, controlling the cleaning robot to move in the one traveling region and performing cleaning work.

5. The cleaning robot according to claim 1, wherein the controlling the cleaning robot not to enter the region in which the carpet is located comprises:

controlling the cleaning robot to drive away from the carpet, or controlling the cleaning robot to move along an edge of the carpet.

6. The method according to claim 1, further comprising: lifting a mop of the cleaning robot.

7. The method according to claim 1, wherein the map is received from a user terminal.

* * * * *